Patented Mar. 10, 1931

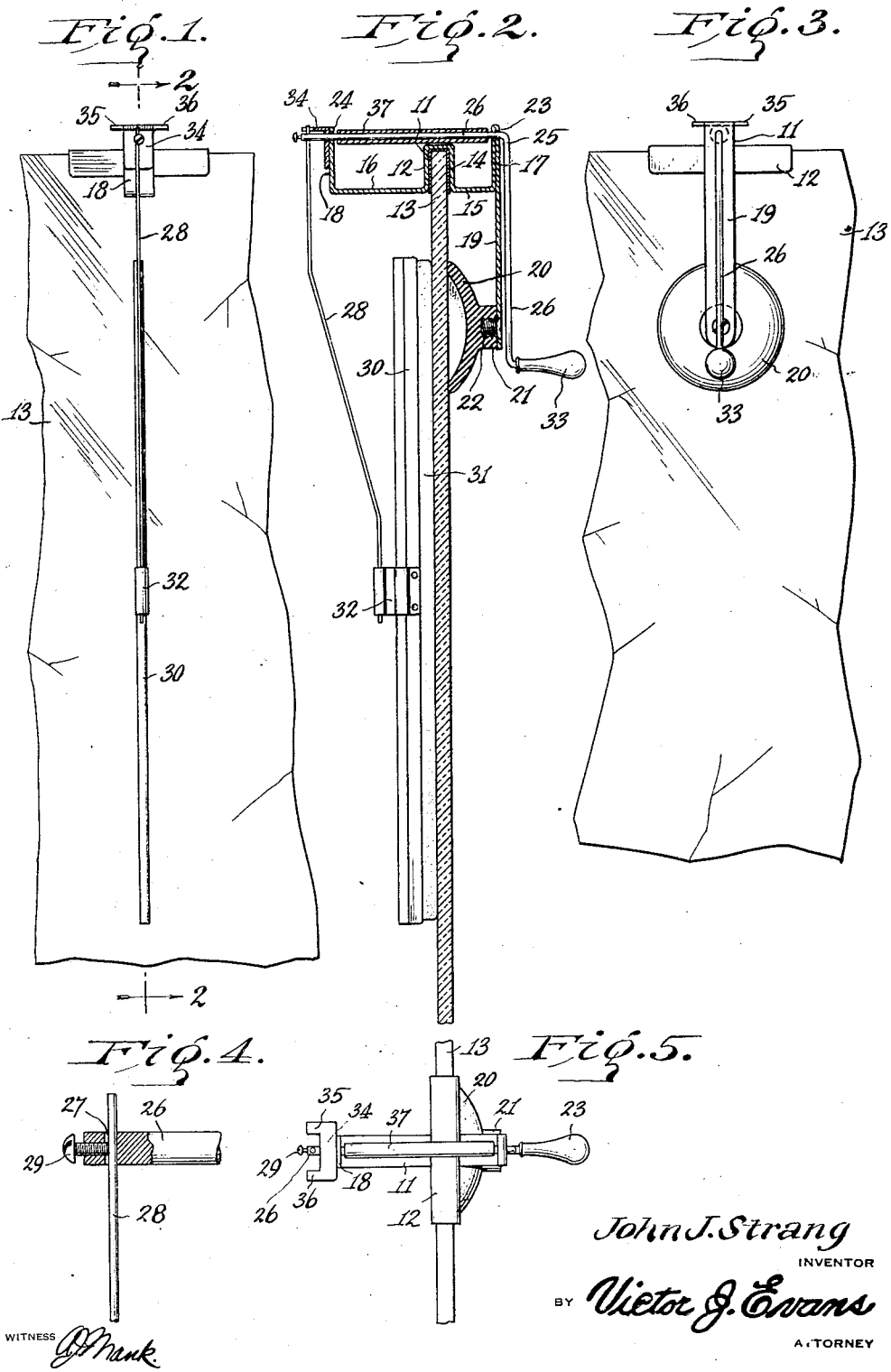

1,796,223

UNITED STATES PATENT OFFICE

JOHN J. STRANG, OF JERSEY CITY, NEW JERSEY

SEDAN-DOOR-GLASS CLEANER

Application filed October 2, 1929. Serial No. 396,739.

This invention relates to glass wipers or cleaners and more particularly to a portable cleaner adapted for use with window glasses of sedan automobile doors and the like.

Various types of cleaners have heretofore been used for the windshields of automobiles, to enable the driver to see the road ahead of the automobile in rain or snowstorms. It is often desirable that the driver of the automobile should be able to also have a clear view through the side doors of the vehicle, so that he can see clearly along side streets, as well as the sides of the road generally. Also, passengers riding in the automobile during a snowstorm or during rain are at a disadvantage and often uncomfortable by reason of their inability to see through the side windows of the vehicle.

The primary object of the present invention is to enable the window glass of an automobile door, such as a sedan door window glass, to be kept clear of rain, snow, frost, or the like, so that a clear view can be had therethrough.

A further object is to provide a portable sedan door glass cleaner to be applied to the window glass of a sedan door or the like when it is desired to use the cleaner, and which can be quickly removed when its use is not required.

A still further object is to provide a sedan door glass cleaner which can be quickly adjusted in place by lowering the glass of the door and hooking the cleaner over the top edge of the glass, and which may be securely held in place by a quick acting device in the form of a suction cup which may be pressed firmly on to the glass; the entire device being quickly removed when desired by simply lowering the window glass in the usual way and sliding the suction cup past the upper edge of the glass.

Another object is to provide a quick attachable or detachable window cleaner which is universally adaptable to right or left hand sedan doors, and to practically any window glass having an edge available on which to position the device.

Still another object is to protect the door frame or the like from being marred or scratched during use of the device.

Another object is to provide a suction device to securely hold the window cleaning device in place on the window.

Still other objects are to simplify and improve the construction and operation of window glass cleaners, and reduce the cost of manufacture thereof; and enable the same to be operated manually or automatically.

Other objects and advantages of the invention will be hereinafter specifically pointed out, or will become apparent, as the specification proceeds.

With the above indicated objects in view, the invention resides in certain novel constructions and combinations and arrangements of parts, clearly described in the following specification and fully illustrated in the accompanying drawings, which latter show embodiments of the invention as at present preferred.

In the drawings:

Figure 1 is a front view of a sedan door window glass showing the present cleaner secured in operative position.

Figure 2 is a transverse section on the line 2—2 of Figure 1, looking in the direction of the arrows.

Figure 3 is a rear elevation of the sedan door window glass showing the attaching means.

Figure 4 is a detail side view, partly in section, illustrating the adjustable connection between the operating shaft and wiper arm.

Figure 5 is a top plan view of the device in operative position.

The sedan door glass cleaner in this instance comprises a frame 11 including a channel portion 12 adapted to fit over the edge of the glass 13. This channel portion 12 is of sufficient length to prevent axial shifting or twisting of the device, and the channel portion is preferably of such width as to embrace the glass with a close fit. The interior of the channel portion 12 may be lined with felt or other resilient material to provide a cushioned mounting and eliminate vibration or noise. Certain window glasses may have a frame, of metal or otherwise, around the edge of the glass; and to accommodate such cases the channel portion 12 is provided in a size to fit over the glass and frame.

The frame 11 in this instance includes a rearwardly extending portion 15 and a forwardly extending portion 16, these portions 15 and 16 being upturned, as seen at 17 and 18 respectively, the upturned portions 17 and 18 extending upward just slightly above the upper edge of the glass 13. The rearward upturned portion 17 is preferably doubled upon itself and extends downward to provide a supporting arm 19.

To support the frame 11, and the parts carried thereby, to be hereinafter referred to, upon the glass 13, I secure a suitable suction cup 20 to the supporting arm 19. This suction cup in the present preferred embodiment consists of a concavo-convex member formed of rubber or similar resilient, impervious material. The suction cup 20 may be secured to the supporting arm 19 in any suitable manner. In this instance the supporting arm is provided with an interiorly screw threaded holder 21 at its lower end; and the suction cup 20 has a threaded projection 22 adapted to be screwed into the holder 21.

The frame 11, including the channel portion 12, the forwardly and rearwardly extending portions 15 and 16, respectively, the upturned portions 17 and 18, and the supporting arm 19, are preferably stamped out of sheet metal, so that all these parts constitute a one piece unit. In the present modification, transverse aligned apertures 23 and 24 are provided at the rearward and forward portions, respectively, of the frame 11; and a manually operated cleaner arm 25 is mounted in the frame 11, this cleaner arm 25 including a horizontally disposed shaft portion 26 which extends through the aperture 23 provided at the upper part of the doubled frame portions 17 and 19 and through the aperture 24 provided at the upper part of the upwardly extending portion 18, and an operating arm 26 arranged substantially at a right angle to the horizontal shaft portion 26. The free end of the shaft portion 26 extends slightly beyond the upwardly extending portion 18, and this free end, in the present instance, has an aperture 27 adapted to receive a wiper arm 28. Means are provided to adjustably support the wiper arm 28 upon the shaft 26; and in the present instance a set screw 29 is threaded through the end of the arm 26 so that it may engage the wiper arm 28 at the aperture 27. A glass wiper or cleaner, which may be of conventional form, is secured at the lower end of the wiper arm 28. In this instance the glass wiper includes an elongated body 30 with a squeegee 31 secured thereto to engage the glass 13. The body 30 is secured to the wiper arm 28 by means of a clamp 32. The operating arm 26 is equipped with a handle 33, manipulation of which in an arcuate path from side to side will produce a like movement of the glass wiper. The wiper arm 28 is preferably formed of spring material so that the squeegee 31 will closely engage the glass 13. To limit the movement of the glass wiper in each direction, a suitable stop device 34 is provided on the frame 11. This stop device in the present instance comprises an angular member secured at the upper part of the upwardly extending frame portion 18, and having arms 35 and 36 at the respective sides, these arms 35 and 36 being adapted to be engaged by the wiper arm 28 and thus to prevent the glass cleaner from sliding past the upper edge of the glass.

To prevent the shaft 25 from injuring the enamel or paint of the upper part of the door frame, the horizontal shaft portion 26 may be provided with suitable cushioning means; and for this purpose in the present embodiment I employ a rubber tube 37 to surround the said shaft portion.

The complete glass cleaner constitutes a handy, portable device, one or more of which may be normally carried in any convenient place in the automobile. When it is raining or snowing the device may be brought forth, and the sedan door glass slightly lowered so that the frame 11 can be positioned on the upper edge of the glass. The suction device 20 is then pressed firmly on to the glass; and the cleaner is thus securely held in operating position. The door glass is then raised so that the shaft cushion 37 abuts against the upper portion of the door frame. It will be seen that by reason of the present construction of the frame there will be only a slight opening between the upper edge of the glass and the door frame, which will be just sufficient for ventilation, but not large enough for rain or snow to enter during a normal fall of either of the latter. The cleaner may be located in any desired position laterally of the door glass, and may be transferred from one door glass to another, as may be desired whether such doors are of the left or right hand variety. The cleaner is released from the glass by sliding the suction device up over the edge of the glass. Thus it is not necessary to employ any more or less complicated clamping device to secure the cleaner on the door, the suction device affording a quick attachable and detachable, as well as adjustable means for holding the glass cleaner firmly in place.

The present suction-mounted glass cleaner may be equipped for automatic operation if desired, by simply attaching the automatic operating means to the inner end of the shaft 26, which may be provided with an aperture or any other convenient means for the purpose.

The wiper arm 28 may be adjusted by the set screw 29 so that the wiper will describe a small or large arc in its travel from side to side; and the device may be adapted for practically any type of sedan door, or any other glass affording an upper edge support for the frame 11.

It will be understood that the construction of the cleaning device itself may be varied to suit different requirements, an essential feature in the present instance however, being the suction mounting for the glass wiper.

The hereinbefore described construction admits of considerable modifications without departing from the invention; therefore, I do not wish to be limited to the precise arrangements shown and described, which are, as aforesaid, by way of illustration merely. In other words, the scope of protection contemplated is to be taken solely from the appended claim, interpreted as broadly as is consistent with the prior art.

What I claim as new is:

A sedan door glass cleaner or the like comprising a frame having a channel portion to rest upon the upper edge of the glass, said frame including forward and rearward upwardly extending portions, said rearward portion carrying a depending arm, a suction device mounted on said depending arm and adapted to secure said frame upon one side of the glass, a shaft mounted in said upwardly extending portions, a glass wiper mounted on said shaft at the opposite side of the glass, means on said shaft to adjust the position of said glass wiper and an operating handle to oscillate said shaft and hence the glass wiper.

In testimony whereof, I hereby affix my signature.

JOHN J. STRANG.